United States Patent
Uebel et al.

(10) Patent No.: US 12,005,857 B2
(45) Date of Patent: Jun. 11, 2024

(54) ADJUSTMENT DEVICE AND METHOD FOR THE POWER-OPERATED ADJUSTMENT OF AN ADJUSTMENT PART ON A VEHICLE BASED ON AT LEAST ONE OPERATING EVENT

(71) Applicant: Brose Fahrzeugteile SE & Co. Kommanditgesellschaft, Bamberg, Bamberg (DE)

(72) Inventors: Wolfgang Uebel, Weitramsdorf (DE); Sergej Gauerhof, Knetzgau (DE); Benjamin Grünewald, Haßfurt / Augsfeld (DE); Carsten Topf, Schonungen (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 493 days.

(21) Appl. No.: 16/934,563

(22) Filed: Jul. 21, 2020

(65) Prior Publication Data
US 2021/0024034 A1    Jan. 28, 2021

(30) Foreign Application Priority Data
Jul. 23, 2019 (DE) ...................... 10 2019 210 912.8

(51) Int. Cl.
*B60R 25/20* (2013.01)
*B60R 25/01* (2013.01)
(Continued)

(52) U.S. Cl.
CPC .......... *B60R 25/01* (2013.01); *B60R 25/2045* (2013.01); *B60R 25/2054* (2013.01); *B60R 25/30* (2013.01); *B60R 25/403* (2013.01)

(58) Field of Classification Search
CPC . B60R 25/01; B60R 25/2045; B60R 25/2054; B60R 25/30; B60R 25/403
See application file for complete search history.

(56) References Cited

U.S. PATENT DOCUMENTS 8,874,324 B2 * 10/2014 Eggers .................... E05F 15/73
                                                      340/426.36
8,942,881 B2 *  1/2015 Hobbs .................... G06V 40/28
                                                      701/1
(Continued)

FOREIGN PATENT DOCUMENTS

DE    102013010993 A1    1/2015
DE    102013018838 A1    5/2015
(Continued)

Primary Examiner — Nay Tun
(74) Attorney, Agent, or Firm — Dickinson Wright PLLC

(57) ABSTRACT

A vehicle including a number of adjustable parts each configured to be adjusted by a motor, a sensor configured to detect a first gesture performed by a first person in a first sensor area indicative of a number of operating events, and a controller configured to, responsive to receiving the first gesture from the sensor, provide the first person a first operating event option and a second operating event option to select either a first operating event or a second operating event, and responsive to receiving a second gesture indicative of a selection of the first operating event, command a first motor to adjust a first adjustable part of the number of adjustable parts.

9 Claims, 5 Drawing Sheets

(51) Int. Cl.
*B60R 25/30* (2013.01)
*B60R 25/40* (2013.01)

(56) References Cited

U.S. PATENT DOCUMENTS

| | | | | |
|---|---|---|---|---|
| 9,449,516 B2* | 9/2016 | Ricci | | G08G 1/143 |
| 9,475,369 B2* | 10/2016 | Sugiura | | B60R 25/2054 |
| 9,845,632 B2* | 12/2017 | Dezorzi | | B60R 25/241 |
| 9,972,150 B2* | 5/2018 | Da Deppo | | G07C 9/28 |
| 10,180,729 B2* | 1/2019 | Park | | B60K 35/00 |
| 10,404,254 B2* | 9/2019 | Tsukao | | B60J 5/101 |
| 10,443,290 B2* | 10/2019 | Tokudome | | B60R 25/2054 |
| 10,466,800 B2* | 11/2019 | Matsubara | | G06V 40/113 |
| 10,836,399 B2* | 11/2020 | Kim | | B60W 40/06 |
| 11,167,771 B2* | 11/2021 | Caron | | G01S 7/415 |
| 2007/0205863 A1* | 9/2007 | Eberhard | | E05F 15/76 |
| | | | | 340/5.72 |
| 2011/0276234 A1* | 11/2011 | Van Gastel | | E05F 15/73 |
| | | | | 701/49 |
| 2012/0166990 A1* | 6/2012 | Jeon | | G06F 3/04883 |
| | | | | 715/810 |
| 2012/0319502 A1* | 12/2012 | Van Gastel | | G07C 9/00658 |
| | | | | 307/116 |
| 2013/0169408 A1* | 7/2013 | Endo | | G07C 9/00309 |
| | | | | 340/5.6 |
| 2013/0261871 A1* | 10/2013 | Hobbs | | G06V 40/28 |
| | | | | 701/1 |
| 2013/0293488 A1* | 11/2013 | Na | | G06F 3/038 |
| | | | | 345/173 |
| 2014/0085487 A1* | 3/2014 | Park | | H04N 1/0044 |
| | | | | 348/207.1 |
| 2014/0089849 A1* | 3/2014 | Choi | | G06F 3/04842 |
| | | | | 715/810 |
| 2015/0009062 A1* | 1/2015 | Herthan | | G01S 7/415 |
| | | | | 342/70 |
| 2015/0019085 A1* | 1/2015 | Ma | | G01S 13/931 |
| | | | | 701/49 |
| 2015/0025740 A1* | 1/2015 | Cartarius | | B60W 50/10 |
| | | | | 701/36 |
| 2015/0025751 A1* | 1/2015 | Sugiura | | B60J 5/101 |
| | | | | 701/49 |
| 2015/0026572 A1* | 1/2015 | Cahill | | G06F 3/0488 |
| | | | | 715/716 |
| 2015/0212641 A1* | 7/2015 | Tanneberger | | B60K 37/06 |
| | | | | 345/173 |
| 2015/0258962 A1* | 9/2015 | Khanu | | G07C 9/00309 |
| | | | | 701/2 |
| 2015/0261159 A1* | 9/2015 | Horishita | | G03G 15/5004 |
| | | | | 399/88 |
| 2016/0098088 A1* | 4/2016 | Park | | B60K 35/00 |
| | | | | 345/156 |
| 2016/0349940 A1* | 12/2016 | Kadur | | G06F 3/017 |
| 2016/0362927 A1* | 12/2016 | Ette | | E05F 15/73 |
| 2017/0114586 A1* | 4/2017 | Tokudome | | B60R 25/2054 |
| 2017/0182975 A1* | 6/2017 | Mönig | | B60R 25/24 |
| 2017/0232932 A1* | 8/2017 | Nishidai | | B60R 25/2054 |
| | | | | 340/5.61 |
| 2017/0251092 A1* | 8/2017 | Elie | | H04W 12/06 |
| 2018/0039409 A1* | 2/2018 | Perkuhn | | B60K 35/00 |
| 2018/0321758 A1* | 11/2018 | Serban | | G06F 3/0325 |
| 2019/0001987 A1* | 1/2019 | Kim | | B60W 60/00136 |
| 2019/0118603 A1* | 4/2019 | Feit | | B60G 11/27 |
| 2022/0171465 A1* | 6/2022 | Luo | | G06V 40/20 |

FOREIGN PATENT DOCUMENTS

| | | |
|---|---|---|
| DE | 102014008430 A1 | 12/2015 |
| DE | 102017128774 A1 | 6/2019 |

* cited by examiner

ADJUSTMENT DEVICE AND METHOD FOR THE POWER-OPERATED ADJUSTMENT OF AN ADJUSTMENT PART ON A VEHICLE BASED ON AT LEAST ONE OPERATING EVENT

CROSS-REFERENCE TO RELATED APPLICATIONS

This application claims the benefit of German Patent Application Serial No. DE 10 2019 210 912.8 filed Jul. 23, 2019, the disclosure of which is hereby incorporated in its entirety by reference herein.

TECHNICAL FIELD

The present disclosure relates to an adjustment device and a method of operating the same to provide power-operated adjustment of an adjustment part of a vehicle based on at least one operating event.

BACKGROUND

The adjustment devices known from practice so far typically provide that in an immediate environment of an adjustment part to be adjusted the execution of exactly one specific gesture in a monitored sensor area must be carried out sensorily in order to be able to trigger an adjustment of the adjustment part. For example, it is provided to carry out a kicking movement with a foot as a gesture below a bumper in order to for example trigger the adjustment of a rear-side vehicle door, for example a liftgate, or of a laterally pivotally or shiftably mounted vehicle door. It is also known to carry out a wiping movement along the horizontal or vertical as a gesture to be detected in front of an adjustable adjustment part of a vehicle, for example a fuel cap, in order to trigger an opening or closing of the respective adjustment part. The previously considered adjustment options, however, still are limited and frequently do not satisfy the increased comfort requirements of the users.

SUMMARY

According to a first embodiment there is proposed an adjustment device for the power-operated adjustment of an adjustment part of a vehicle, i.e. for the adjustment of an adjustment part on or in a vehicle, that may include the following:
 a motor drive for the power-operated adjustment of the adjustment part,
 a sensor device for the contactless detection of an operating event triggered by a person with at least one body part (FT, H) (e.g. by carrying out at least one gesture), and
 an electronic control unit, via which the operating event can be detected on the basis of at least one sensor signal generated by the sensor device and in response thereto a power-operated adjustment of the adjustment part can be triggered by the motor drive.

The sensor device may be configured to monitor at least two spatially different sensor areas. Furthermore, the electronic control unit is configured to evaluate in which of the at least two spatially different sensor areas an operating event has been detected and, in dependence on the evaluation, in which of the at least two spatially different sensor areas the operating event has been detected, to trigger a power-operated adjustment of the adjustment part by the motor drive or to electronically trigger another function on the vehicle. Consequently, when for example a gesture has been detected in a sensor area, the power-operated adjustment of the adjustment part is triggered. On the other hand, when the gesture is detected in another monitored sensor area, another function is electronically triggered on the vehicle.

As an example, one and the same gesture triggers different control commands, depending on the question in what sensor area and hence in what spatial position the gesture has been carried out (in, on or in the environment of the vehicle). Thus, in conjunction with the sensor device the electronic control unit is equipped to assess e.g. an executed gesture as an operating event for different functions depending on the position, of which functions at least one function is the power-operated adjustment of the adjustment part.

For detecting a spatial position of a body part of a person, with which a gesture to be assessed as an operating event is carried out, the sensor device may include for example at least one or exactly one sensor, in particular a radar sensor or an ultrasonic sensor. Via a radar sensor or an ultrasonic sensor, for example, the absolute position of a body part in space or in addition a velocity during a movement of this body part can be detected. Thus, not only the gesture as such is to be recognized in this way, but also the position at which the gesture is carried out.

As an example, the triggering of the power-operated adjustment of the adjustment part can be effected immediately after the detection of the operating event triggered by the executed gesture. Alternatively, it can be provided that at least one further criterion must still be fulfilled, before a power-operated adjustment of the adjustment part actually is triggered via the electronic control unit. This in particular first includes a preceding, additional query to the person whether the adjustment of the adjustment part (or the triggering of the other function on the vehicle) actually is desired.

In one embodiment, the sensor device is equipped and provided for detecting a gesture carried out by a hand and/or a foot. For example, this includes the fact that the sensor device (together with the electronic control unit) is equipped and provided to detect a wiping gesture carried out with a hand and/or a kicking movement carried out with a foot, in order to (each) asses a corresponding gesture or corresponding gestures as an operating event. Alternatively or in addition, the sensor device can be equipped and provided to assess a presence of at least one body part (e.g. a hand and/or a foot, in particular both feet) of a person in a sensor area or in a trigger area located in the sensor area for a certain period as at least part of an operating event. Thus, an operating event in particular may include a combination of an executed gesture with a subsequent presence. Likewise, an operating event can merely be defined by a presence of at least one body part or the person in a sensor area or in a defined trigger area of the sensor area.

As another function, an adjustment of at least one further adjustable adjustment part of the vehicle can be triggerable via the electronic control unit. In an exemplary embodiment, this for example includes the possibility to adjust, i.e. for example to open or close, the one or the other adjustment part depending on the question at which spatial position and hence in which of the different sensor areas a gesture has been carried out. For example, when a wiping gesture in the chest area of an average-sized user is carried out at the rear end of a vehicle, this is assessed as an operating event for opening a rear-side vehicle door, i.e. a liftgate. When the same wiping gesture is carried out in the head area or even at a higher level, the adjustment of a sliding roof of the vehicle is triggered.

In principle, the alternatively triggerable function need not necessarily be accompanied by the adjustment of a (further) adjustment part, but for example also can relate to the actuation of an electronic component of the vehicle, which is in no direct operative relationship with the adjustment part. For example, the at least one electronic component is actuatable via the electronic control unit in order to have the electronic component switch to another of at least two different operating modes. Consequently, the electronic component can have at least two different operating modes between which switching is possible upon detection of a valid operating event via the sensor device and the electronic control unit. For example, a person can carry out a gesture in a first sensor area in order to trigger an adjustment of an adjustment part, and can carry out the same or another gesture in another sensor area in order to trigger the switching of an electronic component of the vehicle to another operating mode. Switching to another operating mode for example includes the fact that an electronic component, in particular a system comprising the electronic component, is turned on or off. Thus, a corresponding electronic component for example can be part of an alarm system of the vehicle and/or include a lamp. For example, a person thus can control the opening or closing of a lateral or rear-side vehicle door by carrying out a gesture in a first sensor area in the environment of the vehicle. When the same or another gesture is carried out in another sensor area, this for example leads to the activation or deactivation of a lighting in the interior of the vehicle, in particular in a rear-side loading space.

In an exemplary embodiment, at least one of the at least two spatially different sensor areas of the sensor device is provided for monitoring a vehicle interior space. In this embodiment, an area in the environment of the vehicle hence is not or not only monitored for the presence of an operating event for adjusting an adjustment part. Rather, this embodiment provides that an adjustment of an adjustment part within the vehicle interior space can (also) be effected by gesture control. A corresponding adjustment part in the interior space for example can be a flap or a lid within the vehicle interior space, in particular a flap of a glove box or a center console, or a vehicle seat or a part of a vehicle seat.

In addition to at least one sensor area at least partly monitoring a vehicle interior space, there can also be provided at least one sensor area for monitoring an environment of the vehicle. For example, one and the same sensor device can be equipped to assess a gesture carried out in a vehicle interior space on an inside of a vehicle door as an operating event for the (further) opening of the vehicle door in the direction of an opening direction. When the same gesture is detected in a sensor area outside the vehicle and hence on an outside of the vehicle door, this is assessed as an operating event for adjusting the vehicle door in an opposite closing direction. Alternatively or in addition, a particular gesture carried out in a vehicle interior space in the vicinity of a side window by means of the proposed control device can lead to the fact that the side window is lowered or lifted in a power-operated way. When the same gesture on the other hand is carried out on the outside of the vehicle in the environment of the side window, the gesture leads to the triggering of another function. This in particular includes the fact that for example merely an error message is issued so as to be acoustically and/or visually perceptible for a person, which indicates that the gesture has been recognized as a valid operating event as such, but due to the position of the gesture carried out the desired function cannot be triggered.

In one or more embodiments, an adjustment device is provided that may include an electronic control unit configured to trigger the output of a query perceptible for a person in response to a detected operating event and, on the basis of a further operating event detected in response to the query, to trigger a power-operated adjustment of the adjustment part by the motor drive or to electronically trigger another function on the vehicle.

As an example, in response to a detected (primary) operating event of a person a query is signaled in an acoustically, haptically and/or visually perceptible way in order to decide which function actually is to be triggered. In response to the query, the person hence can signal whether an adjustment of the adjustment part actually is to be triggered by the motor drive or whether another function on the vehicle is to be actuated electronically. In response to the detected (primary) operating event, a further (secondary) operating event thus is queried in a dialog with the person in order to trigger the one or the other function, depending on what further (secondary) operating event subsequently is detected.

The further (secondary) operating event may be triggered by the person or otherwise in response to the triggered query and/or may be detectable via the sensor device or another, additional sensor device. Hence, this includes the possibility that after a gesture assessed as a valid (primary) operating event a person receives an acoustically, haptically and/or visually perceptible hint (e.g. on a vehicle or a mobile device, such as a mobile phone or a transponder associated to the vehicle), by which the person is informed what different functions may now be triggered by the person, depending on which further (secondary) operating event subsequently may be detected by the sensor device and the electronic control unit.

In one embodiment, the further operating event may likewise be detected in a contactless way and/or a gesture carried out by a person may be detected as the further operating event. Consequently, the one sensor device for example may be equipped to also detect the further operating event in a contactless way. For example, a first gesture in the environment of the vehicle and here in particular in the environment of the adjustable adjustment part is assessed as a (primary) operating event triggering the query. Depending on which further second gesture is carried out subsequently, the person may trigger an adjustment of the adjustment part or another function. In an exemplary embodiment, for example, the execution of a kicking movement by the person in the environment of a vehicle door is assessed as a (primary) operating event triggering the query. Via the query triggered in response thereto, the user then either may trigger the opening of the vehicle door by a wiping gesture carried out with his hand in the environment of the vehicle door. On the other hand, when the person carries out a circling movement with a wagging index finger in the environment of the vehicle door in response to the query, a side window of the vehicle door is lowered or lifted (depending on the direction of rotation of the index finger).

In one embodiment, the electronic control unit is configured to signal to the person via the query (for example in an acoustically, haptically and/or visually perceptible way) that by carrying out a first gesture, also referred to as "first selection gesture", a power-operated adjustment of the adjustment part may be triggered, and by carrying out another second (selection) gesture the other function may be triggered on the vehicle. Hence, it is signaled to a person that depending on which secondary (selection) gesture is carried out subsequently, i.e. in particular after the primary gesture triggering the query, different control commands are generated, which lead either to the adjustment of the adjustment part or to the actuation of another function. As already explained above, the other function may include the adjustment of another adjustment part and/or the actuation of at least one electronic component for switching to another operating mode.

An adjustment device of the further aspect easily may be combined with an adjustment device of the first aspect explained above so that for example the query triggered in response to the detected (primary) operating event is dependent on the question in which of at least two spatially different sensor areas each monitored by the sensor device the operating event has been detected. For example a kicking movement detected as a (primary) operating event may trigger a query (and hence a query dialog) with the person in a lower, rear area of the vehicle, in order to then trigger an adjustment of an adjustment part or another function in response to a further (secondary) operating event. When the kicking movement is carried out at another point, for example no query may be triggered and directly in response to the detected kicking movement an (other) adjustment part may be adjusted or another function may be triggered— which then e.g. may also be different from the function triggered only after the query in response to the further (secondary) operating event.

A proposed adjustment device both of the first aspect and of the second aspect in particular may include at least one radar sensor, as explained already.

The subject-matter of the proposed solution furthermore also is a vehicle comprising an embodiment of a proposed adjustment device.

In one or more embodiments, a method for the adjustment of an adjustment part of a vehicle is provided.

The method may include:
contactless detection of an operating event triggered by a person with at least one body part by using an electronic sensor device, and
triggering of a power-operated adjustment of the adjustment part based on the detected operating event.
Furthermore, it is provided that
(a) at least two spatially different sensor areas are monitored by the sensor device, and it is evaluated in which of the at least two spatially different sensor areas an operating event has been detected, in order to trigger a power-operated adjustment of the adjustment part or to electronically trigger another function on the vehicle in dependence on the evaluation in which of the at least two spatially different sensor areas the operating event has been detected, or
(b) in response to the detected operating event the output of a query perceptible for the person is triggered and on the basis of a further operating event detected in response to the query a power-operated adjustment of the adjustment part is triggered or another function is electronically triggered on the vehicle.

Hence, whether either an adjustment of the adjustment part is triggered or another function is electronically triggered, such as controlled, on the vehicle, thus depends on the question of (a) in what sensor area an operating event triggered with a body part, e.g. at least one gesture, has been detected and/or (b) what further operating event is detected in response to the triggered query.

An embodiment of a proposed method can be realized by an embodiment of a proposed adjustment device. The advantages and features of embodiments of a proposed adjustment device assembly as explained above and below thus also apply for embodiments of a proposed method.

BRIEF DESCRIPTION OF THE DRAWINGS

The attached Figures by way of example illustrate possible embodiments of the proposed solution.

In the drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

From the prior art, for example DE 10 2013 010 993 A1, it is known already to make a power-operated, i.e. motor-driven, adjustment of an adjustment part of a vehicle dependent on the detection of an operating event which goes back to a gesture carried out by a person. A corresponding gesture, for example with a hand and/or a foot, is sensorily detected in a contactless manner and utilized for triggering an adjusting movement of the adjustment part. Via an electronic control unit it is evaluated for example whether a movement pattern detected for an executed gesture corresponds with a reference pattern stored in a memory of the electronic control unit (possibly plus any tolerances). When a correspondence is given, the presence of a valid operating event is inferred and the adjusting movement is triggered. Before triggering the adjusting movement it possibly is also verified that the gesture has been carried out by an authenticated user or at least a valid authentication means is present in the environment of the vehicle.

Figure 1:
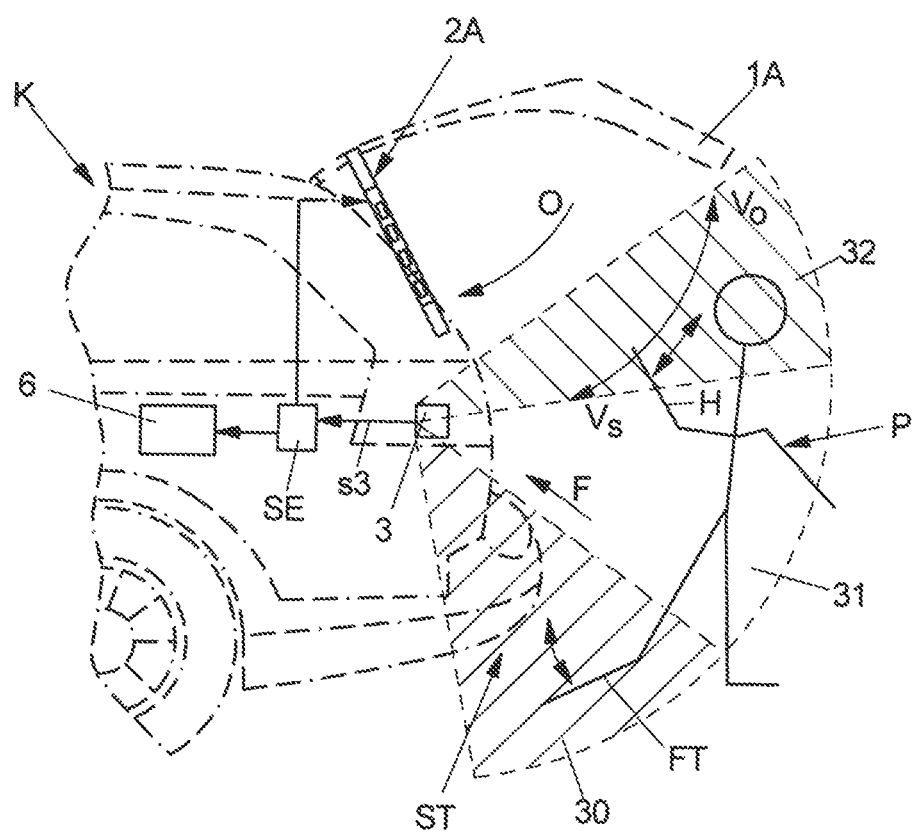
FIG. 1 shows an embodiment of a proposed adjustment device for realizing a variant of a proposed method for the power-operated adjustment of a liftgate on a vehicle.

FIG. 1 sectionally shows a vehicle F in a side view looking at a rear end of the vehicle F. At the rear end of the vehicle F a rear-side vehicle door, i.e. a liftgate 1A, is pivotally mounted on a body K in order to close and, when necessary, clear a body opening O at the rear end of the vehicle F. The liftgate 1A is adjustable in a power-operated way via a motor drive 2A. The liftgate 1A thus can be opened by means of the motor drive 2A, such as along an adjustment direction Vo. Alternatively or in addition, the motor drive 2A can be used to close the liftgate 1A and therefor pivot along an opposite adjustment direction Vs.

For controlling the adjusting movement, the motor drive 2A is coupled with an electronic control unit SE. The electronic control unit SE can receive sensor signals s3 from a sensor device 3 which in the present case may include, for example, at least one radar sensor. Via the sensor device 3, spatially different sensor areas 30, 31 and 32 are monitored for the occurrence of a possible operating event. What is detected as an operating event is the execution of a gesture, and in dependence on the sensor areas 30, 31 or 32 in which the gesture is executed by a person P different functions can be controlled on the vehicle F, which may include the adjustment of the liftgate 1A. In principle, a gesture for example is assessed as a valid operating event when a recognized movement pattern of the gesture carried out corresponds with a reference pattern stored in the electronic control unit SE, possibly by taking account of predefined tolerances. For example, when the person P carries out a kicking movement with their foot FT in the region of or under a bumper ST below the liftgate 1A as a gesture, this kicking movement is detected in the (lower) sensor area 30 of the sensor device 3 comprising a radar sensor. For example, a radar sensor can detect in a position-resolved way at what absolute position within the space a gesture is carried out, and in addition can also detect at what speed and with what direction of movement the gesture is carried out. When the kicking movement of the foot FT is detected in the sensor area 30, the electronic control unit SE actuates the motor drive 2A for example to open the liftgate 1A. On the other hand, when the kicking movement is detected in another sensor area, for example in the sensor area 31, another function of the vehicle F is thereby actuated, for example in order to open a side door of the vehicle F or to activate or deactivate a lighting on the vehicle.

To avoid that every gesture of a person P present in the environment of the vehicle F leads to the triggering of a particular function, controlled by an electronic control unit SE, it can be provided that the concrete triggering is effected even before the authentication of the person P or at least is dependent on the presence of a valid authentication means associated to the vehicle F, for example a transponder, in the environment of the vehicle F.

By monitoring the different sensor devices 30, 31 and 32 via the sensor device 3, the person P furthermore can trigger the closing of the liftgate 1A for example by carrying out a gesture with their hand H in a region at chest height and hence at least 1.5 m above the ground on which the vehicle F is disposed. In that gestures of the person P are detected by the sensor device 3 in a position-resolved way, different functions on the vehicle F hence can easily be controlled thereby.

In one variant, a dialog with the person P can be started after the detection of a (primary) operating event in one of the sensor areas 30, 31 or 32 of the sensor device 3 via the electronic control unit SE in order to enable the person P to choose between different functions which now can be triggered by the person P as a result of a subsequent (secondary) operating event. Thus, the electronic control unit SE triggers a query, in response to which a further (secondary) operating event can be triggered by the person P in order to trigger one of several (at least two) different functions, at least one of which may include an adjustment of the liftgate 1A.

For example, after the execution of a kicking movement with the foot FT in the sensor area 30 in the environment of the bumper ST, the electronic control unit SE in an acoustically, haptically and/or visually perceptible way signals to the person P a query which indicates that now several options for a triggering function are available. The query for example can be signaled in a visually perceptible way on a display provided on the vehicle and on the liftgate 1A, for example. Alternatively or in addition, an acoustically, haptically and/or visually perceptible query can be triggered by a mobile device carried by the person P.

When the person P, e.g. after triggering the query, carries out a further kicking movement with the foot FT in the (lower) sensor area 30, the closed liftgate 1A for example is opened and hence pivoted along the adjustment direction Vo. On the other hand, when subsequently a particular gesture is carried out by the person P with the hand H in the other (upper) sensor area 32 as a further (secondary) operating event in response to the triggered query, the electronic control unit SE actuates an electronic component 6 of the vehicle F. The actuation of the electronic component 6 then for example leads to the activation of an alarm system of the vehicle F, to a lighting on or in the vehicle F being turned on or off and/or to the operation of a lock for the liftgate 1A, for example a central locking system of the vehicle F. In this way, the person P can easily and comfortably control different functions of the vehicle F via various gestures carried out subsequently and possibly in different sensor areas 30, 31 and 32.

Figure 2:
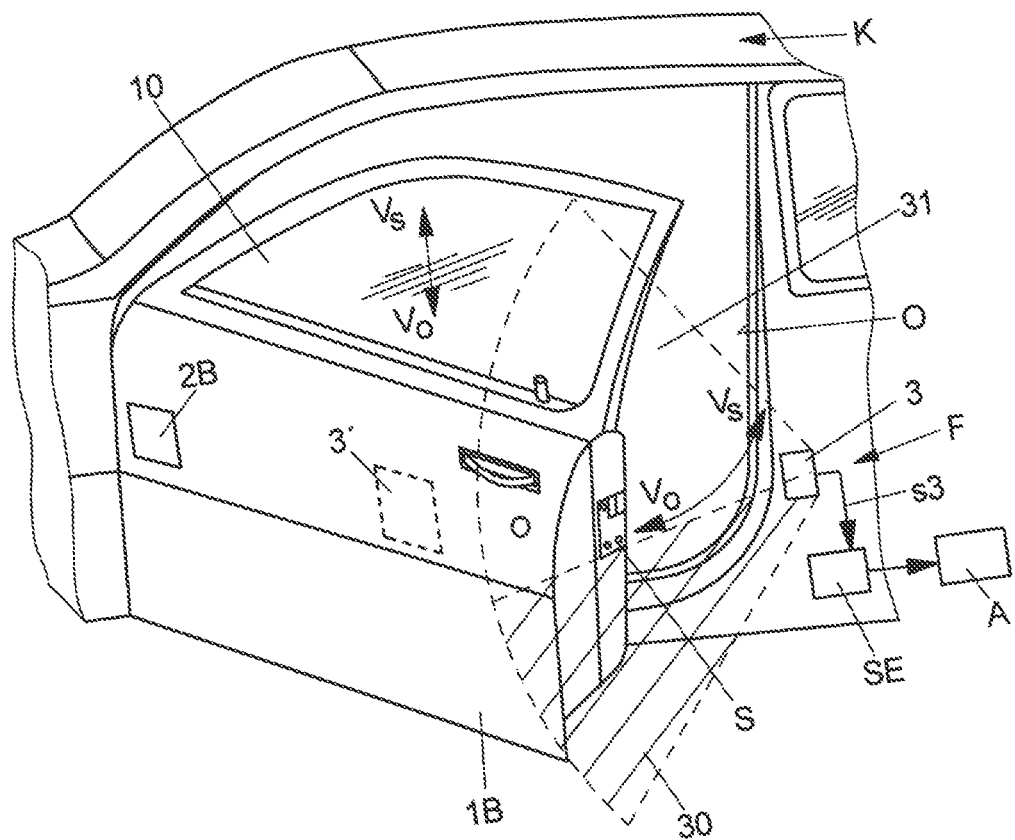
FIG. 2 shows another embodiment with a lateral vehicle door as an adjustment part to be adjusted.

FIG. 2 shows another embodiment of the proposed solution, in which via the sensor device 3 different sensor areas 30 and 31 in the environment of the lateral vehicle door 1B of the vehicle F are monitored. Via the sensor device 3 and an electronic control unit SE coupled therewith an adjusting movement of the vehicle door 1B hence can be controlled by means of a motor drive 2B. In this way, for example the vehicle door 1B can be opened along an adjustment direction Vo by motor control in response to a detected, valid operating event or can be closed along a direction Vs by motor control.

The sensor device 3 in principle can be provided in a body component of the vehicle F. In one embodiment, the sensor device, here for example comprising a radar sensor, can also be arranged on or in the vehicle door 1B itself. This is shown in FIG. 2 with reference to a sensor device 3'.

Via the respective sensor device 3, 3' and the electronic control unit SE coupled therewith, the adjustment of a window pane 10 of the vehicle door 1B furthermore can be effected by gesture control. For example, when a kicking movement is carried out with a foot in a monitored sensor area 30 of the sensor device 3 of FIG. 2, which is located closer to the ground, this can be assessed as an operating event for opening the side door 1B. On the other hand, when a wiping gesture is carried out along a vertical in a sensor area 31 located above the same, this can be assessed—by one and the same sensor device 3, 3'—as an operating event for adjusting the window pane 10. Depending on the direction of the wiping gesture carried out, the window pane 10 then is either lowered along an adjustment direction Vo or lifted along an opposite adjustment direction Vs (each power-operated by means of a motorized window lifter drive).

Analogous to the embodiment explained above in connection with FIG. 1, the electronic control unit SE in the embodiment of FIG. 2 also can trigger a query in response to a (primary) operating event in order to trigger one of several different functions only in response to a subsequent additional (secondary) operating event. In the variant of FIG. 2, the electronic control unit SE is coupled with a display A for a query visually perceptible by a person P, in order to indicate to the person that in response to the primary operating event detected as valid it now is possible—for example by carrying out at least two different gestures, such as gestures carried out at different spatial positions—to trigger different functions on the vehicle F.

Figure 3:
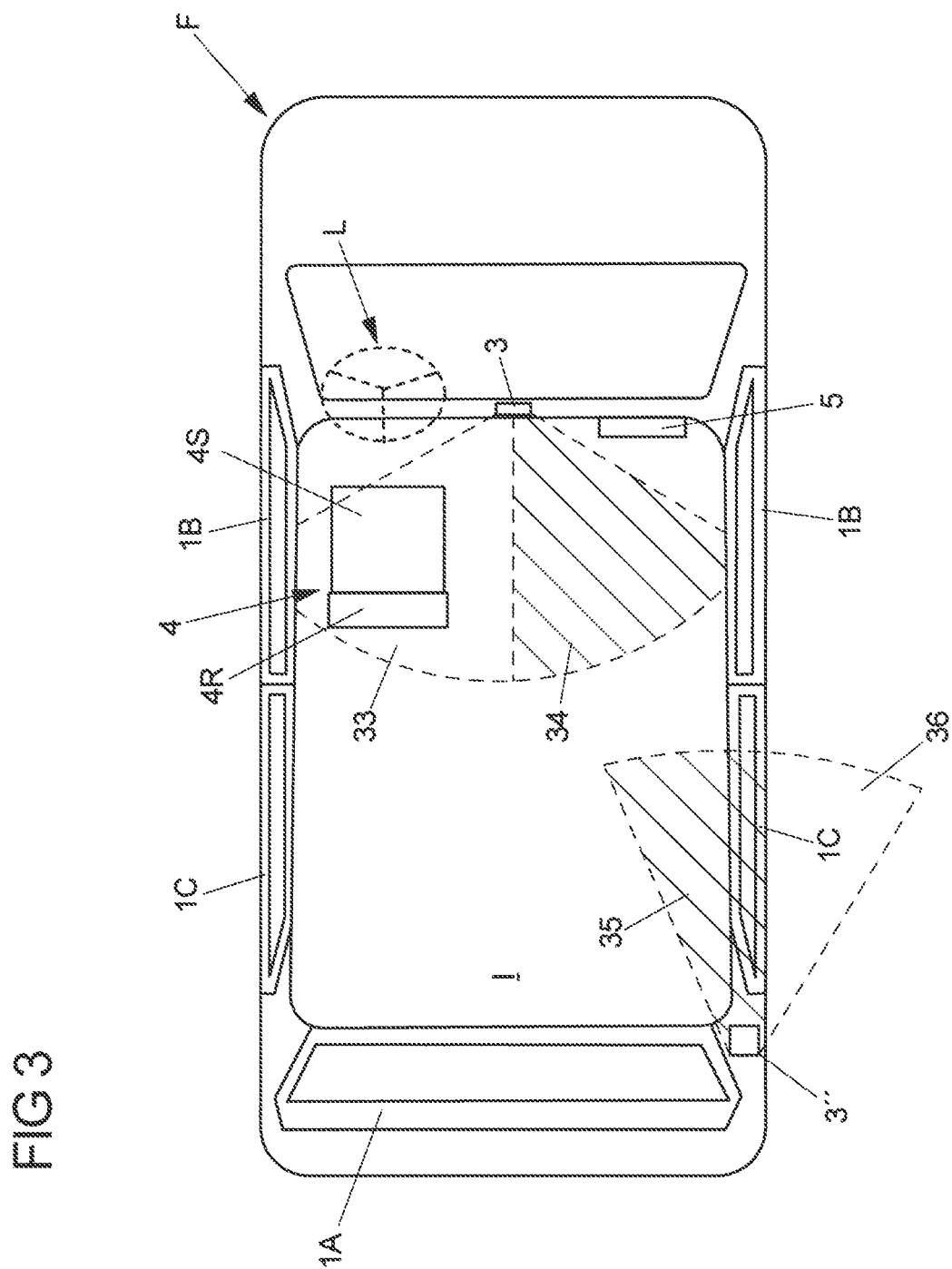
FIG. 3 shows another embodiment of the proposed solution for controlling adjustment parts within a vehicle interior space and/or for detecting an operating event within a vehicle interior space.

In the embodiment of FIG. 3, a sensor device 3 is used to monitor a vehicle interior space I in two spatially different sensor areas 33 and 34 for the occurrence of a possible operating event. In this way, a person within the vehicle interior space I for example can control an adjustment of an adjustment part within the vehicle interior space I and at least one further function on the basis of gestures. As possible adjustment parts to be adjusted a vehicle seat F is provided for example. A vehicle seat F—which here is associated to a driver of the vehicle F due to an arrangement in front of a steering wheel L of the vehicle F—for example can be adjusted within the vehicle interior space I, in particular be longitudinally shifted and/or be rotated about a vertical upright axis. Alternatively or in addition, a backrest 4R of the vehicle seat 4 and/or a seat part 4S, relative to which the backrest 4R is adjustable, can be adjusted by gesture control. Furthermore, a glove box flap 5 for example can be adjusted by gesture control, and here as well the adjustment depends on the question in which of the monitored sensor areas 33 or 34 a particular gesture is carried out.

In the embodiment of FIG. 3 another sensor device 3" for the rear vehicle area furthermore is provided by way of example. By means of this sensor device 3", which possibly can be provided as an alternative to the sensor device 3 monitoring the front part of the vehicle interior space I, two spatially different sensor areas 35 and 36 are monitored, which on the one hand are associated to the vehicle interior space I and on the other hand to the environment of a rear vehicle door 1C. Correspondingly, depending on whether a gesture is carried out by a person within the vehicle interior space I and hence in the one sensor area 35, a function other than a function in response to the execution of possibly the same gesture in a sensor area 36 located outside the vehicle F can be actuated in front of the rear vehicle door 1C.

Figure 4:
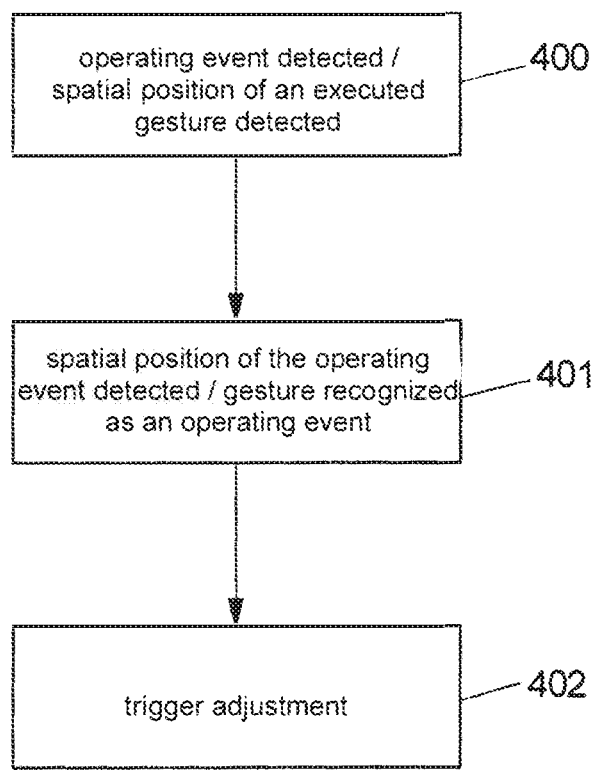
FIG. 4 shows a flow diagram for an embodiment of a proposed method.

FIG. 4 illustrates a possible embodiment of a proposed method, in particular a method which can be used in connection with the adjustment devices explained by way of example with reference to FIGS. 1, 2 and 3.

In a first method step 400, an operating event for example initially is detected with reference to a gesture carried out. Subsequently, in a further method step 401, the spatial position of the operating event detected as valid is recognized in order to trigger for example an adjustment of a particular adjustment part, such as the liftgate 1A or a vehicle door 1B or 1C, in a further method step 402. As can be taken from FIG. 4, it is also possible as an alternative to initially detect in the electronic control unit SE at what spatial position a gesture currently is carried out by a person P in order to only subsequently decide whether the gesture carried out corresponds to a valid operating event. Here, it merely is decisive that in addition to a recognition of a particular gesture it likewise is evaluated at what spatial position and hence in what area in the environment of the vehicle F the respective gesture is carried out in order to be able to decide what function thereby is triggered on the vehicle F.

Figure 5:
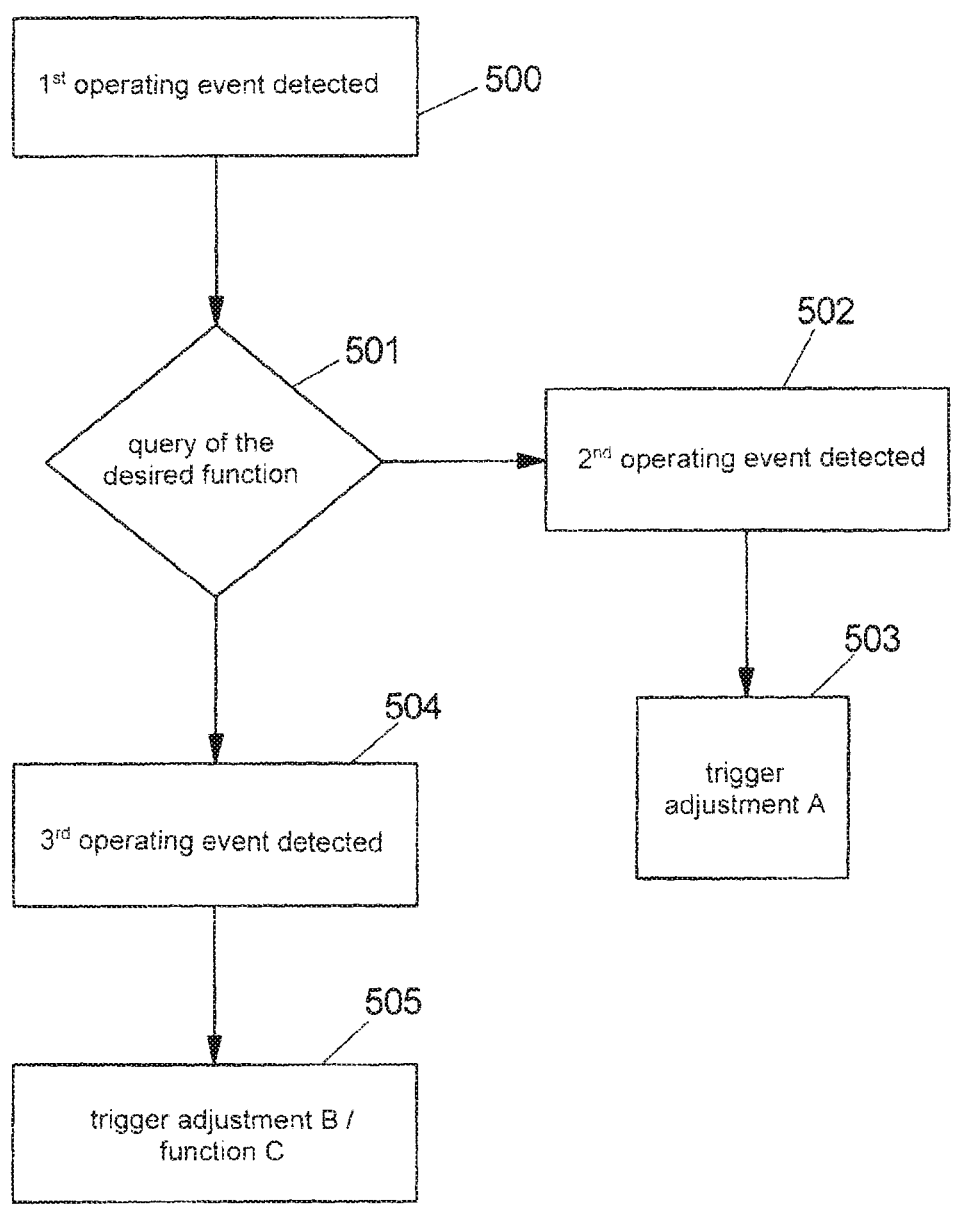
FIG. 5 shows a flow diagram for another embodiment of a proposed method.

The flow diagram of FIG. 5 illustrates an exemplary embodiment in which an additional query dialog with a person is provided in order to decide on triggering one function out of several different possible functions.

First of all, a first (primary) operating event is recognized in a first method step 500. In response thereto, a query of the desired function is triggered in a method step 501. Depending on what gesture and/or in what spatial position a respective gesture is carried out by a person in response to this query, a second (secondary) or a third (secondary) operating event then is recognized. For example, when the second operating event is recognized in a method step 502, the adjustment of a particular adjustment part, such as the liftgate 1A or the side door 1B, is effected in response thereto in a method step 503. On the other hand, when in response to the query the third operating event is recognized in a method step 504, the adjustment of another adjustment part and/or the triggering of another function on the vehicle F is effected in a subsequent method step 505.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1A, 1B, 1C vehicle door (adjustment part)
10 window pane (adjustment part)
2A, 2B drive
3, 3', 3" sensor device, comprising a radar sensor
30-36 sensor area
4 vehicle seat (adjustment part)
4R backrest (adjustment part)
4S seat part (adjustment part)
5 glove box flap (adjustment part)
6 electronic component
A display
F vehicle
FT foot
H hand
I vehicle interior space
K body
L steering wheel
O body opening
P person
SE electronic control unit
ST bumper
s3 sensor signal
Vo, Vs adjustment direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. An adjustment device for power-operated adjustment of an adjustment part of a vehicle, the adjustment device comprising:
 a motor drive; a sensor device configured to monitor a first sensor area and a second sensor area, spaced apart from one another, for contactless detection of an operating event triggered by a person's body part disposed within either the first sensor area or the second sensor area; and
 an electronic control unit responsive to determining that a first sensor signal is based on the person's body part being disposed within the first sensor area, and configured to, based on a first operating event in the first sensor area:

output a query to request whether a first vehicle function or a second vehicle function is to be triggered; and determine whether a second sensor signal is based on the person's body part being disposed within either the first sensor area or the second sensor area; wherein the electronic control unit, responsive to determining that the second sensor signal is based on the person's body part being disposed within the first sensor area and thus based on a second operating event in the first sensor area, is configured to trigger the first vehicle function commanding the motor drive to provide the power-operated adjustment of the adjustment part and, wherein the electronic control unit, responsive to determining that the second sensor signal is based on the person's body part being disposed within the second sensor area and thus based on a second operating event in the second sensor area, is configured to trigger the second vehicle function.

2. The adjustment device of claim 1, wherein the sensor device is configured to detect a gesture carried out by a hand or a foot and/or detect presence of the body part in at least one of the first and second sensor areas for a defined period.

3. The adjustment device of claim 1, wherein the second vehicle function is adjusting another adjustable adjustment part of the vehicle.

4. The adjustment device of claim 1, wherein the second vehicle function is actuating an electronic component of the vehicle.

5. The adjustment device of claim 4, wherein the electronic control unit is further configured to, responsive to actuation of the electronic component, switch from a first operating mode to a second operating mode.

6. The adjustment device of claim 1, wherein the first sensor area is disposed in an interior space of the vehicle.

7. The adjustment device of claim 1, wherein the adjustment part is a lateral vehicle door or a rear-side vehicle door.

8. The adjustment device of claim 1, wherein the adjustment part is disposed within an interior space of the vehicle.

9. The adjustment device of claim 8, wherein the sensor device includes at least one radar sensor.

* * * * *